F. L. JOHNSON.
COLLAPSIBLE TIRE CORE.
APPLICATION FILED SEPT. 26, 1919.
1,356,721.
Patented Oct. 26, 1920.
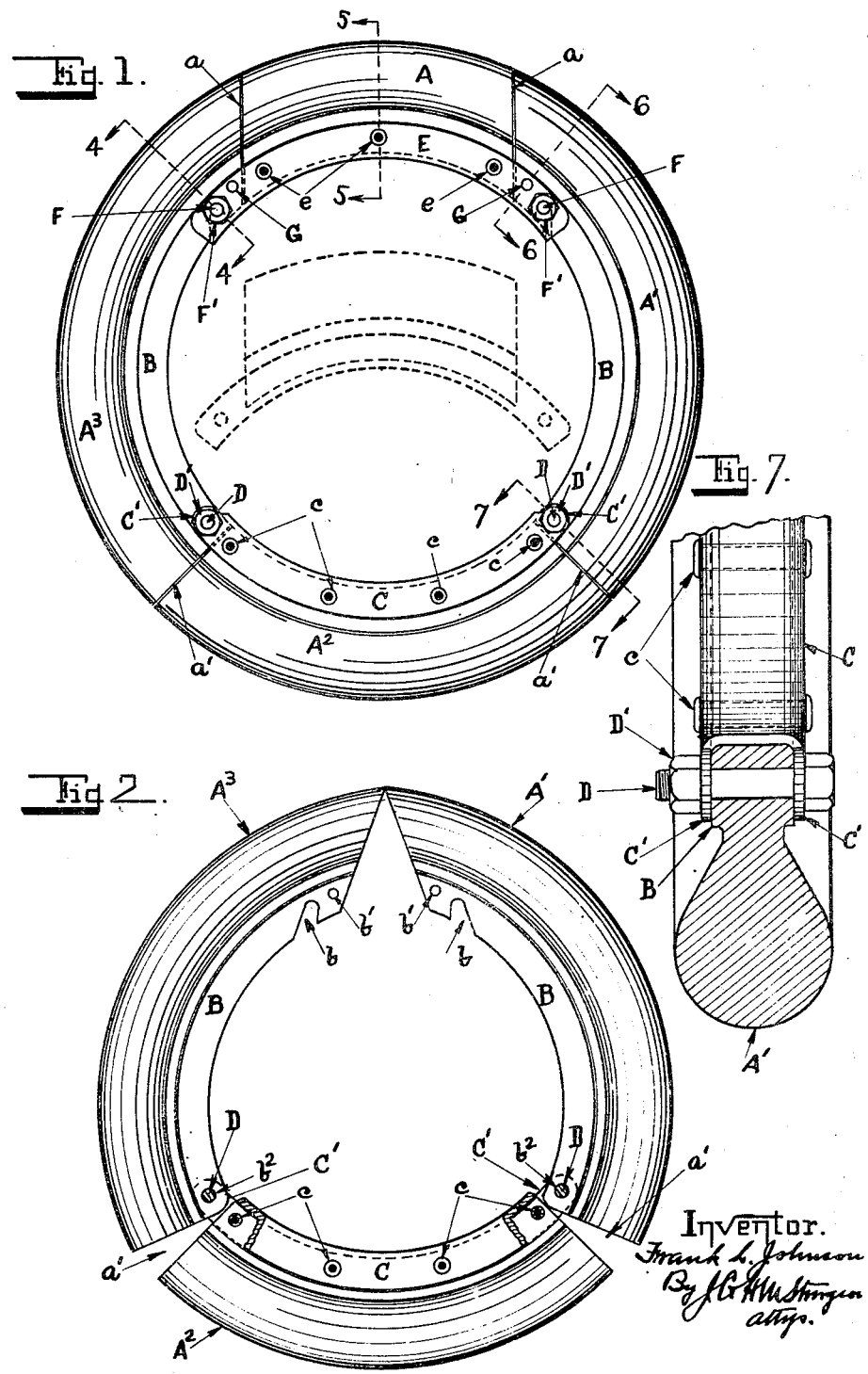

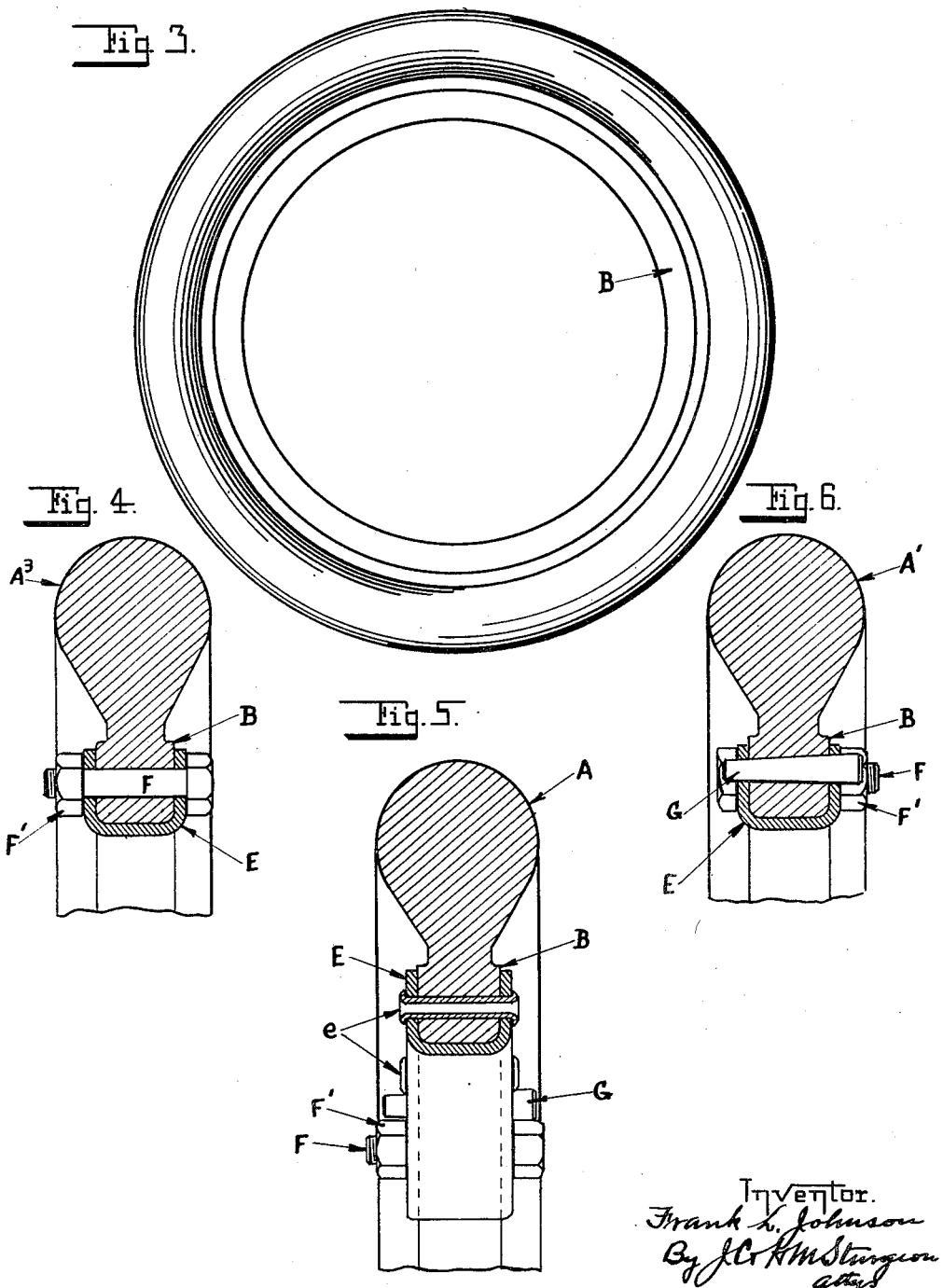

UNITED STATES PATENT OFFICE.

FRANK L. JOHNSON, OF AKRON, OHIO.

COLLAPSIBLE TIRE-CORE.

1,356,721.  Specification of Letters Patent.  Patented Oct. 26, 1920.

Application filed September 26, 1919. Serial No. 326,472.

*To all whom it may concern:*

Be it known that I, FRANK L. JOHNSON, a citizen of the United States, residing at Akron, in the county of Summit and State of Ohio, have invented certain new and useful Improvements in Collapsible Tire-Cores; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to appliances for the manufacture of pneumatic tire casings, and consists in certain improvements in the construction of collapsible cores upon which such casings are built up and vulcanized, hereinafter particularly explained and pointed out.

The object of the present invention is to simplify the construction of tire cores and to provide firm and accurate fastenings for the several parts thereof.

The features of my invention are hereinafter fully explained and pointed out and are illustrated in the accompanying drawings in which:

Figure 1, is a side view in elevation of a tire core embodying my invention.

Fig. 2, is a like view of the same, collapsed.

Fig. 3, is a like view of a tire core before being provided with my invention.

Fig. 4, is an enlarged section on the line 4—4 in Fig. 1.

Fig. 5, is an enlarged section on the line 5—5 in Fig. 1.

Fig. 6, is an enlarged section on the line 6—6 in Fig. 1.

Fig. 7, is an enlarged section on the line 7—7 in Fig. 1.

In these drawings Fig. 3 shows a tire core which has been machined in a suitable lathe so that it is ready to be cut transversely into separate parts A, A', A², and A³, as shown in Fig. 1, my invention enabling me to readily finish the core complete on a machine tool prior to the installation thereon of the fastenings hereinafter described. This feature simplifies and cheapens the construction of cores made in accordance with the invention, without detracting from the mechanical perfection of the finished core.

When the core shown in Fig. 3 is completely finished, it has around its inner periphery an annular ring B which is substantially equilateral in cross-section, as shown in Figs. 4, 5, 6 and 7.

The finished annular core is then cut transversely with separate parts A, A', A² and A³, the part A being separated by means of vertical cuts $a$, $a$, and the parts A', A² and A³ by means of radial cuts $a'$, $a'$, as shown in Figs. 1 and 2.

The inner ring B on the parts A' and A³ is provided, adjacent to the cuts $a$, $a$, with recesses $b$, $b$, which open inwardly, and also with dowel-pin openings $b'$ $b'$, (see Fig. 2) and said parts are also provided with hinge-bolt openings $b^2$, $b^2$, adjacent to the radial cuts $a'$.

Upon that portion of the ring B on the part A² of the core, I place preferably, segmental channel iron C and secure the same in place thereon by means of rivets $c$, or in any other suitable manner, whereby the same will be firmly and permanently secured to the part A². The sides of the segmental channel iron C extend beyond the ends of the part A² in the form of ears (see Figs. 1, 2 and 7) which are provided with holes which coincide with the hinge bolt holes $b^2$ in the parts A' and A³, through which I place hinge bolts D, D, as shown in Fig. 7, which are provided with nuts D', D', by means of which the ears C' can be drawn tightly against the flat sides of the ring B on the parts A' and A² of the core, so as to prevent any unnecessary play in said hinged parts.

Upon the portion of the ring B on the part A, I secure another segmental channel iron E by means of rivets $e$, or in any other suitable manner whereby said channel will be firmly and permanently secured thereto, the ends of said channel iron projecting beyond the ends of the part A sufficiently to overlap the recesses $b$ in the portions of the ring B on the parts A' and A³ of the core.

In the sides of the channel iron E adjacent to the ends thereof are holes which coincide with the recesses $b$, $b$, and through which are placed bolts F which are provided with nuts F', as shown in Figs. 1 and 4, so that when the part A of the core is placed in position as shown in Fig. 1, the bolts F in the recesses $b$, $b$, and the nuts F' serve to draw the ends of the sides of the channel iron E firmly against the flat sides of the ring B adjacent to the cuts $a$, $a$.

To further secure the part A in position, I provide tapered openings through the sides of the channel iron and ring B adjacent to the bolts F, in which I place tapered dowel pins G, (see Figs. 1 and 6) which securely retain the part A in position while the tire is being built up thereon.

It is evident that I can, if desired, use segmental plates instead of the segmental channel irons C and E, with equally good results.

In operation, after a tire has been built up on the core shown in Fig. 1, and cured thereon, and it is desired to remove the core from the tire, the dowel pins G are removed, the nuts F loosened, and the part A of the core is withdrawn inwardly, as shown by broken lines in Fig. 1; the parts of the core A' and A³ are then swung inwardly upon the hinge bolts D, out of the tire as shown in Fig. 2, and the tire can then be removed therefrom.

I am aware that tire cores have heretofore been made to collapse, and for that purpose have been cut in part as shown and described herein; and that such parts have been hinged and otherwise secured together; but I am not aware of any tire cores having their several parts secured together by metal plates secured on the sides of an inner ring in the manner I have herein shown and described, so that the body of the core can be completely machine finished before being cut into parts or sections, and then the fastening means secured thereon as the last operation in the manufacture of the core.

Therefore having shown and described my invention so as to enable others to utilize the same, what I claim as new and desire to secure by Letters Patent is:

1. A collapsible tire core comprised of four sections, one of which sections is removable, a metal plate secured on each side of said removable section, the ends of which plates extend beyond the ends of said removable section overlapping the ends of the adjoining core sections, and means to removably secure the ends of said plates to said adjoining sections, substantially as set forth.

2. A collapsible tire core comprised of four sections, three of which are hinged together, and the fourth section being removable, a metal plate secured on each side of said removable core section, the ends of which plates extend beyond the ends of said section and overlap the ends of the adjoining sections, bolts having screw threads passing through the ends of said plates and said adjoining core-sections, and nuts engaging the threads on said bolts, substantially as set forth.

3. A collapsible tire core comprising four sections, three of which are hinged together, two of said hinged sections having recesses in their inner periphery, and a removable section, plates secured on said removable section, the ends of which overlap the ends of two of said hinged sections, screw threaded bolts passing transversely through the ends of said plates and adapted to enter the recesses in said hinged sections, and nuts on said bolts adapted to draw said plates firmly against said adjoining hinged sections, substantially as set forth.

4. A collapsible tire core comprising four sections, three of which are hinged together, and the fourth being removable, a metal plate secured on each side of said removable section, the ends of which plates over lap the ends of two of said adjoining hinged sections, and tapering dowel-pins passing through coinciding holes in said metal plates and said hinged sections, substantially as set forth.

5. A collapsible tire core comprising four sections, three of which are hinged together, and the fourth being removable, of a segmental channel iron secured on the inner periphery of said removable section, the ends of which channel iron overlap the ends of the adjoining hinged core sections, and means to secure the ends of said channel iron in place on the ends of said adjoining core sections, substantially as set forth.

6. A hinge for collapsible tire core sections comprising substantially a plate secured on each side of an intermediate core section, the ends of which overlap the ends of tire sections to be hinged thereon, and a pivot bolt passing through the ends of said plates and the end of the adjoining tire section, substantially as set forth.

7. A hinge for collapsible tire core sections, comprising substantially a segmental channel iron secured on the inner periphery of an intermediate section, ears on the ends of said channel iron which overlap the ends of the adjoining core-sections, and a bolt passing through said ears and adjoining core sections, substantially as and for the purpose set forth.

In testimony whereof I affix my signature.

FRANK L. JOHNSON.